United States Patent Office 3,652,614
Patented Mar. 28, 1972

3,652,614
RHODIUM COMPLEXES CONTAINING TERT-PHOSPHINE LIGAND
Kenneth C. Dewhirst, New Rochelle, N.Y., and Wilhelm Keim, Alameda, and Helmut E. Thyret, Oakland, Calif., assignors to Shell Oil Corporation, New York, N.Y.
No Drawing. Original application Oct. 20, 1966, Ser. No. 587,972, now Patent No. 3,502,725, dated Mar. 24, 1970. Divided and this application Oct. 23, 1969, Ser. No. 871,328
Int. Cl. C07f 9/50
U.S. Cl. 260—429
6 Claims

ABSTRACT OF THE DISCLOSURE

Production of aromatic 2,7-alkadienyl ethers and N-(2,7-alkadienyl)amines by reacting phenols or organic amines, wherein there is present at least one N-hydrogen substituent, with conjugated alkadienes in the presence of rhodium(I) complexes containing tertiary phosphine ligands and additionally containing hydrogen, phenoxide, acetate, alkyl, aryl or π-allyl ligands.

---

This is a division of applicants' copending application Ser. No. 587,972, filed Oct. 20, 1966, now Pat. No. 3,502,725, issued Mar. 24, 1970.

This invention relates to a process for the production of aromatic 2,7-alkadienyl ethers and of N-(2,7-alkadienyl)amines, and to novel catalysts therefor.

PRIOR ART

Methods are available in the art for the dimerization of conjugated dienes under conditions whereby a derivative of the diene dimer is observed. In general, such methods produce a diene moiety which is branched; for example, from the dimerization of butadiene is typically obtained a methylheptadiene moiety as the principal acyclic product type. General methods of producing diene dimer derivatives wherein the diene moieties have dimerized in a linear manner have not been available. In copending applications of E. J. Smutny, U.S. Ser. Nos. 455,965, now abandoned, and 455,995, now Pat. No. 3,350,451, both filed May 14, 1965, diene dimer derivatives wherein the diene moieties have dimerized in a linear manner have been obtained utilizing palladium-, platinum-, or ruthenium-containing catalyst.

THE INVENTION

It has now been found that aromatic 2,7-alkadienyl ethers and N-(2,7-alkadienyl)amines are produced by reacting phenols or organic amines, wherein there is present at least one N-hydrogen substituent, with conjugated alkadienes in the presence of certain rhodium-containing complexes as catalyst. Although the mechanism of the condensation process is not completely understood, the process of the invention results in the efficient production of ethers, one moiety of which is derived from the phenol reactant and the other moiety of which may be considered as derived from a dimer of the diene reactant, and of amines wherein the organic amine product has as a nitrogen substituent a moiety which may be considered as derived from a dimer of the diene reactant. By way of illustration, from the reaction of phenol and butadiene in the process of the invention is obtained 1-phenoxy-2,7-octadiene and from the reaction of piperidine and butadiene is obtained N-(2,7-octadienyl)piperidine.

REACTANTS

The conjugated diene employed as a reactant in the process of the invention is an α,ω-conjugated alkadiene having only hydrogen substituents on the terminal carbon atoms of a four-carbon chain. Dienes with nonhydrogen substituents on the internal, i.e. nonterminal, carbon atoms are suitably employed, provided that the internal-carbon substituents do not unduly sterically hinder the diene dimerization. A preferred class of diene reactants comprises vicinal dimethylidenealkane of from 4 to 6 carbon atoms or, alternatively, butadiene having from 0 to 2 internal-carbon methyl substituents. These diene compounds are butadiene, isoprene and 2,3-dimethylbutadiene. Of these butadiene is particularly preferred.

The process of the present invention is broadly applicable, with respect to the ether products, to a wide variety of compounds incorporating within their structure at least one phenolic hydroxyl group and the process is suitably employed with phenols of complex or of comparatively simple structure. Best results are obtained when phenols of comparatively simple structure are employed such as when the phenol reactant comprises a mono- to di-nuclear aromatic compound possessing at least one hydroxyl substituent on at least one six-membered carbocyclic aromatic ring and having from 6 to 24 carbon atoms. The phenol reactant has from 1 to 3, preferably from 1 to 2, hydroxyl groups attached to each ring, and when the phenol is dinuclear, the aromatic rings are suitably fused, are attached directly by carbon-carbon bonds between ring carbon atoms, or are connected by an alkylene bridge of from 1 to 12 carbon atoms. The phenol reactant is an unsubstituted phenol, that is, contains no substituents other than hydrogen and hydroxyl on the aromatic ring(s) or alternatively is a substituted phenol containing ring-carbon substituents other than hydrogen or hydroxyl, which substituents are hydrocarbyl, i.e., contain only atoms of carbon and hydrogen, or are nonhydrocarbyl containing atoms such as halogen, nitrogen or oxygen. When the phenol reactant is substituted, it is preferred that each substituent be an electron-donating substituent, which term is herein employed to indicate a substituent which is generally considered to be ortho-para directing when attached to an aromatic ring. Illustrative of such electron-donating substituents are alkyl including cycloalkyl, halogen, particularly halogen of atomic number from 17 to 35, i.e., chlorine and bromine, alkoxy, aryloxy, dialkylamino, halomethyl and the like.

Exemplary mononuclear phenol reactants include phenol, p-chlorophenol, m-bromophenol, p-ethylphenol, 2,6-dimethylphenol, 2,4-dichlorophenol, p-tert-butylphenol, p-methoxyphenol, p-cyclohexylphenol, m-hexylphenol, 2,4-diethylphenol, p-dimethylaminophenol, hydroquinone, resorcinol, ethylhydroquinone, 2,5 - dichlorohydroquinone, phloroglucinol, and 5-methoxyresorcinol. Dinuclear phenols are illustrated by dinuclear phenols wherein the rings are fused, such as α-naphthol, β-naphthol, 1,4-dihydroxynaphthalene, 1,5-dihydroxynaphthalene, 1,4,6-trihydroxynaphthalene, 4-chloro-1,8-dihydroxynaphthalene, 4,8-dimethyl-1,5-dihydroxynaphthalene and 8-hydroxyquinoline; dinuclear phenols wherein the rings are attached directly by carbon-carbon bonds between ring carbon atoms; e.g., phenylphenol, 4,4'-dihydroxybiphenyl, 2,4'-dihydroxybiphenyl, 3,4',5-trihydroxybiphenyl, 2,2'-dichloro-4,4'-dihydroxybiphenyl, 3,3'-dihydroxy-5,5'-diethylbiphenyl and 3,4'-dihydroxy-5-butylbiphenyl, and dinuclear phenols wherein the rings are joined by an alkylene bridge of from 1 to 12 carbon atoms such as bis(4-hydroxyphenyl)methane, 2,2-bis(4-hydroxyphenyl)propane, 1,2-bis(3,5-dihydroxyphenyl)ethane, 3,3-bis(2-chloro-4-hydroxyphenyl)hexane, bis(3-hydroxy-5-methylphenyl)methane, bis(2,6-dimethyl-4-hydroxyphenyl)methane and 2,2-bis(2-propoxy-4-hydroxyphenyl)butane. In general hydrocarbon or halohydrocarbon phenols, generically designated (halo) hydrocarbon phenols, are preferred over phenols having non(halo)hydrocarbyl substituents, and particularly preferred are unsubstituted mono- to di-nuclear phenols wherein each aromatic ring possesses a single hydroxyl substituent.

The optimum ratio of phenol reactant to conjugated diene will depend in part upon the functionality of the phenol, that is, the number of phenolic hydroxyl groups present in the phenol reactant molecule, as well as the extent of reactant conversion that is desired. Ratios of moles of diene to moles of phenolic hydroxyl group as low as about 1:4 are suitable if only low conversion, e.g., 5–10%, is employed. However, to obtain higher conversions, an excess of diene is preferred an ratios of moles of diene to moles of phenolic hydroxy group from about 3:1 to about 10:1 are more satisfactory, with best results being obtained when ratios of moles of diene to moles of phenolic hydroxyl group from about 3.5:1 to about 6:1 are utilized.

In the process of the invention with respect to the amine products, the conjugated diene is contacted with an organic amine having within the molecular structure thereof at least one amino moiety, i.e., a trivalent nitrogen atom wherein from 1 to 2 of the nitrogen substiuent(s) is (are) hydrogen and the remaining nitrogen valences are bonded to substituent group(s) through a bond to a carbon atom. The process of the invention is broadly applicable to a wide variety of organic amines of complex or comparatively simple structure which have at least one N-mono- to N,N-dihydro-nitrogen moiety within the molecular structure. Best results, however, are obtained when the organic amine reactant employed in the process is of comparatively simple structure. The organic amine reactant suitably is an organic amine of up to 20 carbon atoms and is a monoamino compound or is a polyamino compound of up to 4 amino-nitrogen atoms, preferably up to 2. Whether the structure of the organic amine reactant of the present invention incorporates a plurality of amino moieties or only one amino moiety, at least one amino nitrogen has one N-hydrogen substituent, that is, the amino moiety is a secondary amino moiety, or has two N-hydrogen substituents, that is, the amine moiety is a primary amino moiety. The presence of other amino-nitrogen groups which are tertiary amine groups and therefore contain no N-hydrogen substituents is not detrimental to the process of the invention, but at least one amino moiety present in the organic amine reactant, preferably each amino moiety present, is nontertiary, i.e., is either primary or secondary amino having from 1 to 2 N-hydrogen substituents. The organic portion of the amine reactant is suitably wholly aliphatic in character or incorporates one or more aromatic moieties. Furthermore, the amine reactant is suitably a hydrocarbon amine having only atoms of carbon and hydrogen besides the amino nitrogen atom(s), or is a substituted-hydrocarbon amine containing atoms of oxygen and halogen, particularly up to 4 atoms of halogen of atomic number from 18 to 35 inclusive, i.e., the middle halogens chlorine and bromine, which atoms are incorporated within functional groups such as ether, keto, ester, and halo groups, provided that the amine reactant as a whole is devoid of acidic hydrogens, that is, the amine reactant contains no hydroxylic hydrogen atoms.

Illustrative aliphatic amine reactants include aliphatic hydrocarbon monoamine such as methylamine, ethylamine, allylamine, n-butylamine, isobutylamine, 3-aminomethylheptane, n-dodecylamine, dimethylamine, dipropylamine, diallylamine, piperidine, methylhexylamine, cyclohexylamine, N-ethylcyclohexylamine and N-octyldodecylamine; aliphatic hydrocarbon polyamines as exemplified by ethylenediamine, trimethylenediamine, 1,4-diaminohexane, diethylenetriamine, 1-aminodecalin, pyrrolidine, N,N-bis(2-aminoethyl)methylamine, 1,8-bis(4-aminobutylamino)octane and 1,4-bis(aminomethyl)cyclohexane; and substituted hydrocarbon mono- and polyamines, e.g., 3-chloropropylamine, 2-methoxyethylamine, 2-propoxy-1,3-diaminopropane, N-methyl-4-acetoxybutylamine, bis (2-methylaminoethyl)ether, 1-amino-4,5-dibromohexane and the like.

The class of suitable amines which incorporate aromatic moieties within the reactant molecular structure includes hydrocarbon wholly aromatic amines, e.g., aniline, benzidine, p-phenylenediamine, pyrrole, and α-naphthylamine; alkarylamines and aralkylamines such as benzylamine, o-toluidine, p-toluidine, β-phenylethylamine, N-methylaniline, 1,2,3,4-tetrahydroquinoline, 2-aminotetralin, N-propylbenzylamine, N-butylaniline, N,N'-bis(ethylamino)benzene, 2,2-bis(4-aminophenyl)propane, 2,6-dimethylaniline, N,N-bis(3-aminophenyl)methylamine and 3-phenylpyrrolidine; and at least partially aromatic amines which are substituted hydrocarbon amines as illustrated by p-chloroaniline, β-aminopyridine, m-methoxyaniline, p-dimethylaminoaniline, N - (3 - chloropropyl)benzylamine, phenoxymethylamine, 4,4'-diamino-2,2'-dibromobiphenyl, p-trichloromethylaniline, N-methyl-p-ethoxyaniline and 2,2-bis(4-amino-3-bromophenyl)-propane.

In general, hydrocarbon and halohydrocarbon amines, generically designated (halo)hydrocarbon amines, are preferred over amine reactants having atoms other than the carbon, hydrogen, halogen, and the amino nitrogen atoms of the (halo)hydrocarbon amine reactants, and monoamines are preferred over analogous polyamino compounds. Particularly preferred are primary and secondary hydrocarbon monoamines wherein the hydrocarbon moiety is hydrocarbon of up to 12 carbon atoms. The class of amines comprising aniline and N-lower alkyl derivatives thereof, i.e., N-(non- to monoalkyl)aniline wherein any alkyl moiety is alkyl of up to 4 carbon atoms, provides particularly desirable results.

The optimum ratio of amine reactant to conjugated diene will depend in part upon the functionality of the amine reactant, that is, the number of nontertiary amino groups present in the amine reactant molecule, and the extent of conversion that is employed. Ratios of moles of conjugated diene reactant to moles of nontertiary amino group as low as about 1:10 are suitable if only a low conversion of the amine is employed. However, to obtain higher conversions, a more substantial proportion of diene is preferred and molar ratios of conjugated diene to nontertiary amino group from about 1:4 to about 10:1 are more satisfactory. Best results are obtained when the molar ratio of diene to nontertiary amino group is from about 1:1 to about 6:1. It should be understood that it is within the contemplated scope of the invention to react, on occasion, only a portion of the nontertiary amino groups present in the amine reactant molecule. For example, in the case of a diamine, reaction takes place at both amine, sites, or alternatively it is contemplated to effect reaction at only one amine group. The restrictive amine formation of the latter illustration is favored by molar reactant ratios comparatively high in the amine reactant.

CATALYST

The catalyst compositions employed in the process of the invention are certain rhodium phenoxide complexes containing organic complexing ligand. The rhodium phenoxide catalyst comprises a rhodium atom bonded to a phenoxide moiety and complexed with at least two complexing ligands. Without wishing to be bound by any particular theory, it appears that the chemical transformations during the course of the reaction which involve the rhodium phenoxide are quite complex, probably involving the formation and destruction of complexes between the rhodium moiety and the diene reactant and/or the presumed diene dimer intermediate, so that no one formula suitably describes the actual catalytic species. In one modification of the process of the invention, catalyst is introduced in a form represented by the formula.

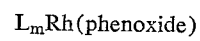

wherein L represents the complexing ligand and $m$ is an integer from 2 to 3 inclusive. Although alternate methods are available for calculating the oxidation state of the rhodium in the above complex, this form of the catalyst is herein referred to as rhodium(I) phenoxide complex. The term L in the above formula represents the ligand employed to stabilize the rhodium phenoxide complex. Although ligands such as carbonyl, olefin, nitrosyl, phenol, and thiophenol are in part operable, the preferred ligand L is a tertiary phosphine. Thus, the preferred complexing ligands are phosphines represented by the formula $$R_3P$$

wherein R independently is an organo group having from 1 to 20 carbon atoms, preferably 1 to 10, and having only aromatic unsaturation. R is therefore saturated aliphatic, including cycloaliphatic, or is aromatic in character, preferably mononuclear aromatic, and is hydrocarbyl, that is, contains only atoms of carbon and hydrogen, or is substituted hydrocarbyl containing, besides atoms of carbon and hydrogen, other atoms such as oxygen, sulfur, nitrogen, and halogen, particularly halogen of atomic number from 9 to 35, which atoms are present in functional groups such as alkoxy, carboalkoxy, acyl, trihalomethyl, halo, cyano, dialkylamino, sulfonylalkyl, alkanoyloxy and like groups having no active hydrogen atoms. A preferred class of nonhydrocarbyl substituents comprises an atom having an atomic number from 7 to 8, i.e., nitrogen or oxygen, one valence of which is satisfied by bonding to an otherwise hydrocarbyl R substituent, and the remaining valence(s) are satisfied by bonding to lower alkyl radicals which are alkyl of from 1 to 4 carbon atoms. Such preferred nonhydrocarbyl substituents are alkoxy wherein the alkyl moiety is alkyl of from 1 to 4 carbon atoms and N,N-dialkylamino wherein each alkyl independently is alkyl of from 1 to 4 carbon atoms.

Illustrative of suitable saturated aliphatic R groups are hydrocarbyl R groups such as methyl, ethyl, propyl, isopropyl, butyl, isooctyl, decyl, lauryl, stearyl, cyclohexyl, cyclopentyl, 3,4-dimethylcyclopentyl, cyclooctyl, benzyl and β-phenylethyl; as well as substituted groups such as 4-bromohexyl, methoxymethyl, 3-(diethylamino)propyl, 4-carbethoxybutyl, and 2-acetoxyethyl. Aromatic R groups include hydrocarbyl aromatic groups such as phenyl, tolyl, xylyl, p-ethylphenyl, p-tert-butylphenyl, m-octylphenyl, 2,4-diethylphenyl, p-phenylphenyl, m-benzylphenyl and 2,4,6-trimethylphenyl; and substituted hydrocarbyl aromatic R groups including p-methoxyphenyl, m-chlorophenyl, m-trifluoromethylphenyl, p-propoxyphenyl, p-carbethoxyphenyl, 2,4-dichlorophenyl, 2-ethyl-5-bromophenyl, p-dimethylaminophenyl, m-diethylaminophenyl, 3,5-dibutoxyphenyl, p-acetoxyphenyl, 2-hexyl-3-methylsulfonylphenyl, 3,5-bis(trichloromethyl)phenyl and 3-dibutylaminophenyl.

In the $R_3P$ ligand as defined above, the R moieties are the same or are different, although ligands wherein all R groups are the same are generally preferred. Exemplary R groups include phosphines such as triethylphosphine, tributylphosphine, triphenylphosphine, tris(4 - methoxyphenyl)phosphine, tris(4-tolyl)phosphine, tris(3-chlorophenyl)phosphine, tris(4 - dimethylaminophenyl)phosphine, diphenylhexylphosphine, dimethyl(3-methoxyphenyl)phosphine, dibutylstearylphosphine, tribenzylphosphine, cyclohexyldibutylphosphine, and the like. In general, phosphine ligands wherein the phosphorus substituents are aromatic are generally preferred over wholly aliphatic phosphine ligands. Largely because of economic reasons, triphenylphosphine is a particularly preferred ligand.

In an alternate modification of the process, the catalyst is provided in the form of rhodium complexes other than the phenoxide but which, under conditions existing in the reaction mixture, i.e. the presence of a phenol, or in the presence of an additional reagent, for example, a phenoxide anion catalyst promoter, in situ forms a rhodium(I) phenoxide complex. Certain of these rhodium complexes are novel compositions and include rhodium complexes represented by the formula $L_mRhZ$, wherein L is hereinabove defined, Z is hydrogen, acetate, lower alkyl of 1 to 4 carbons, and mononuclear aryl of 6 to 10 carbons, when $m$ is 3; and Z is π-allyl and acetate, when $m$ is 2. In this connection, mononuclear aryl is meant to include phenyl, tolyl, xylyl, ethylphenyl, isopropylphenyl, butylphenyl, and the like, and π-allyl is meant to include not only the unsubstituted allyl moiety ($—C_3H_5$) but also substituted moieties, such as π-methallyl ($—C_4H_7$), π-crotyl ($—C_4H_7$), π-cyclohexenyl ($—C_6H_9$), π-cyclooctenyl ($—C_8H_{13}$), and the like. In addition to these novel compositions, certain other rhodium complexes are also useful to produce in situ the required phenoxide catalyst. Exemplary of these are $L_4RhH$, $L_3RhZ$ (Z=Cl), $$L_3Rh(CO)H, [(CO)_2RhCl]_2, [(C_2H_4)_2RhCl]_2$$

and the like. When the rhodium complex is any of the above formulas except a chloride or acetate, then the composition forms in situ a phenoxide in the presence of a phenol. When the rhodium complex is a chloride or acetate, addition of a phenoxide anion catalyst promoter suffices to promote the in situ formation of the desired rhodium(I) phenoxide catalyst. By the term "phenoxide anion" as employed herein is meant the anion resulting, in effect, from removal of the hydroxyl hydrogen of at least one phenolic hydroxyl group, i.e., a compound having at least one hydroxyl group bonded to a carbon atom which is a member of an aromatic ring. The structure of the phenoxide anion is not critical and anions derived from phenols of up to 20 carbon atoms which are mononuclear or polynuclear and are phenols of from 1 to 4 phenolic hydroxyl groups are suitably employed. The phenoxide anion is monovalent, or is multivalent, i.e., a di-, tri- or quadra-anion illustratively obtained by removal of the hydrogen of more than one phenolic hydroxyl group of a phenol having a plurality of phenolic hydroxyl groups. Although phenoxide anions of relatively complex structure are suitably employed as catalyst promoter, largely for reasons of convenience and economy it is preferable to employ a phenoxide anion of comparatively simple structure, for example, an anion of a mononuclear monohydric phenol which is a hydrocarbon phenol of from 6 to 10 carbon atoms containing only atoms of carbon and hydrogen besides the oxygen of the phenolic hydroxyl group, or is a halohydrocarbon phenol additionally having one or more, preferably from 1 to 2, atoms of halogen, particularly chlorine, within the molecule. These phenols are generically designated monohydric (halo)hydrocarbon phenols and the anion thereof as a (halo)hydrocarbon phenoxide monoanion, and are illustrated, in the case of the phenols, by phenol, the cresols, p-chlorophenol, p-tert-butylphenol, the xylenols, 2,4-dichlorophenol, 3,5-diethylphenol and the like. Particularly preferred as the catalyst promoter in the process of the invention is the phenate anion, that is, the anion illustratively produced by removal of the acidic hydrogen of phenol.

The presence of phenoxide anion in the reaction systems may be brought about by any convenient method. In one modification, the phenoxide anion is prepared in situ by addition of a suitable phenol to the reaction mixture. Reaction of the phenol with a minor proportion of amine reactant, if present, results in formation of the phenoxide anion. Alternatively, other bases are added to react preferentially with the phenol because of the more basic character thereof, e.g., tertiary amines such as triethylamine, trimethylamine, pyridine and quinoline. In a preferred modification of this aspect of the process, the phenoxide anion is added as a preformed material, e.g., as a soluble metal salt of a phenol. Suitable metal salts include alkali metal phenoxides, particularly sodium phenoxides, which are conveniently prepared by neutralization of a suitable phenol with alkali metal base, for example an alkali metal hydroxide such as sodium hydroxide, or by direct reaction of the phenol with alkali metal. The phenoxide anion is desirably present in molar amounts that are equal to or greater than the molar amount of rhodium-containing catalyst compound. Molar ratios of phenoxide anion to metal compound from about 1:1 to about 8:1 are satisfactory, although molar ratios from about 1:1 to about 4:1 are preferred.

The process of the invention is characterized by the requirement for only catalytic quantities of rhodium compound. Although utilization of larger amounts of rhodium-containing catalyst is not detrimental to the process of the invention, aomunts larger than about 5 mole percent based on total reactants are not generally required. Amounts of rhodium compound less than about 0.001 mole percent on the same basis are generally unsuitable because of the inevitable physical losses of catalyst during reaction and processing. In most instances, amounts of catalyst from about 0.01 mole percent to about 0.5 mole percent based on total reactants are satisfactory and are preferred.

REACTION CONDITIONS

The process of the invention is typically conducted by charging the reactants, catalyst and catalyst promoter to an autoclave or similar reactor and maintaining the reaction mixture at reaction temperature until reaction is complete. The method of mixing is not critical although it is generally preferred to mix the reactants and add the catalyst and catalyst promoter thereto. The reaction is suitably conducted throughout a wide range of reaction temperatures and pressures, so long as the reactants are maintained substantially in the liquid phase. Reaction temperatures from about −20° C. to about 150° C. are satisfactory, although temperatures from about 0° C. to about 130° C. are preferred and best results are obtained when a temperature from about 80° C. to about 125° C. is employed. Typical reaction pressures vary from about 1 atmosphere to about 80 atmospheres. Frequently, good results are obtained when the reaction pressure is autogenous, that is, the pressure generated when the reactants are maintained at reaction temperature in a sealed reaction vessel. Such pressures are from about 1 atmosphere to about 20 atmospheres.

The process of the invention is conducted in the presence or in the absence of a solvent. In the modification wherein solvent is employed, solvents that are suitable are those capable of dissolving the reactants and catalyst, and are inert to the reactants and the products prepared therefrom. Exemplary solvents are ethers, including dialkyl ethers such as diethyl ether, dibutyl ether and methyl hexyl ether; alkyl aryl ethers such as anisole and phenyl butyl ether; cyclic ethers such as tetrahydrofuran, dioxane and dioxolane; and lower alkyl ethers (full) of polyhydric alcohols or polyoxyalkylene glycols such as ethylene glycol dimethyl ether, diethylene glycol dimethyl ether, tetraethylene glycol dimethyl ether and glycerol triethyl ether; aromatic hydrocarbons such as benzene, toluene and xylene; N,N-dialkyl alkanoic acid amides, e.g., dimethylformamide and N,N-diethylacetamide; halogenated hydrocarbons such as chloroform, carbon tetrachloride, tetrachloroethylene, methylene chloride and bromoform; sulfoxides such as dimethylsulfoxide; and nitriles such as acetonitrile and benzonitrile. The solvent, if any, is employed in molar excess over the amount of total reactants, and in general, moles of solvent up to about 150 moles per mole of total reactants are satisfactory. For convenience, it is generally preferred to conduct the reaction in the absence of added solvent whenever the physical characteristics of the reaction mixture, particularly the melting point, will allow.

Subsequent to reaction, the reaction mixture is separated and the desired product recovered by conventional means such as selective extraction, fractional distillation and chromatographic techniques.

REACTION PRODUCTS

The ether products of the invention are aryl alkadienyl ethers illustratively produced dimerization of the diene reactant and reaction of the diene dimer with the phenol reactant to etherify at least one of the phenolic hydroxyl groups. In terms of the phenol reactants as previously defined, the products of the invention are aryl alkadienyl ethers wherein the alkadienyl moiety is 2,7-octadienyl or methyl-internally-substituted 2,7 - octadienyl depending upon the particular alkadiene reactant employed, and the aryl moiety is that moiety illustratively obtained by removal of at least one hydroxyl group of a mono- to dinuclear phenol possessing from 1 to 3 phenolic hydroxyl groups on six-membered carbocyclic aromatic ring. The octadienyl moiety will have from 0 to 4 methyl substituents, depending upon the degree of methyl substitution on the diene reactant. When butadiene is employed as the diene reactant, the alkadieyl moiety will be 2,7-octadienyl. Alternatively, when the diene reactant is isoprene, the alkadienyl moiety is principally 3,7-dimethyl-2,7-octadienyl and/or 3,6-dimethyl-2,7-octadienyl and when 2,3-dimethylbutadiene is the diene reactant, the alkadienyl moiety is 2,3,6,7-tetramethyl-2,7-octadienyl. Generically these alkadienyl moieties are represented by the formula

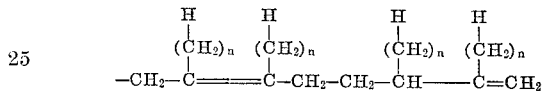

wherein $n$ independently is a whole number from 0 to 1 inclusive. Although it is within the contemplated scope of the invention to prepare alkadienyl ethers of polyhydric phenols wherein only a portion of the phenolic hydroxyl groups within the phenol reactant molecule are etherified, the preferred ether products of the invention are those wherein each phenolic hydroxyl present within the phenol reactant has been etherified with an alkadienyl moiety as previously defined.

It will be apparent that a wide variety of aryl alkadienyl ethers can be prepared by the process of the invention by varying the phenol and diene reactants. Illustrative of these products are 1-phenoxy-2,7-octadiene prepared from phenol and butadiene, 1-phenoxy-3,6-dimethyl-2,7-octadiene and 1-phenoxy-3,7-dimethyl-2,7-octadiene prepared from phenol and isoprene, and 1-phenoxy-2,3,6,7-tetramethyl-2,7-octadiene prepared from phenol and 2,3-dimethylbutadiene, as well as other illustrative products such as 1-(p-chlorophenoxy)-2,7-octadiene,
1-(2,4-dichlorophenoxy)-2,7-octadiene,
1-(2,6-diethylphenoxy)-3,6-dimethyl-2,7-octadiene,
2,2-bis[4-(2,7-octadienyloxy)phenyl]propane,
1,4-bis(2,7-octadienyloxy)benzene,
1,5-bis(3,7-dimethyl-2,7-octadienyloxy)naphthalene,
3,3′-bis(2,3,6,7-tetramethyl-2,7-octadienyloxy)biphenyl,
1-(p-methoxyphenoxy)-2,7-octadiene,
1-(3,5-dibromophenoxy)-2,7-octadiene,
bis[3-(3,6-dimethyl-2,7-octadienyloxy)phenyl] methane and the like.

The ether products of the invention are useful in a variety of applications. The remaining unsaturated linkages can be hydrated or hydroxylated to form useful alcohol derivatives from which can be prepared esters or ethers. The ethylenic linkage serves as a dienophile in Diels-Alder condensations or as a reactive site for polymerization or copolymerization processes. The ether products may be hydrolyzed to form useful alkadienols, e.g. 2,7-octadienol, from which esters, sulfonates, sulfates and the like are prepared; for example, phthalic acid is esterified with 2,7-octadienol to give di(2,7-octadienyl) phthalate, which upon polymerization yields a polyester resin. The ether products also may be treated with organic peracids for the conversion of the ethylenic linkages into epoxy groups as described in copending application of W. De Acetis et al., U.S. Ser. No. 456,001 now Pat. No. 3,432,465, filed May 14, 1965. For example, 1-(2,4-dichlorophenoxy)-2,7-octadiene is reacted with peracetic acid to obtain the monoepoxides of 1-(2,4-dichlorophenoxy)-2,7-octadiene and/or the diepoxide; 1-(2,4-dichlorophenoxy)-2,3-epoxy-7-octene, 1 - (2,4-dichlorophenoxy)-7,8-epoxy-2-octene, and 1-(2,4-dichlorophenoxy)-2,3,7,8-diepoxyoctane are each useful for the production therefrom of resin products.

The amine products of the invention are N-(alkadienyl) amines illustratively produced by dimerization of the diene reactant and reaction of the diene dimer with the amine reactant to effect the N-alkadienylation, that is, to effect the introduction of the alkadienyl moiety as a nitrogen-substituent, of at least one of the nontertiary amino nitrogen moieties. In terms of the organic amine reactants as previously defined, the products of the invention are N-(alkadienyl)amines wherein the alkadienyl moiety is 2,7-octadienyl or methyl-substituted 2,7-octadienyl, depending upon the particular diene employed, and the amino moiety is that moiety illustratively obtained by removal of at least one N-hydrogen substituent of an organic amino of up to 20 carbon and of from 1 to 4 amino-nitrogen atoms, at least one of which is a nontertiary amino moiety, that is, possesses at least one hydrogen substituent. The octadienyl moiety will have from 0 to 4 methyl substituents, depending upon the degree of methyl substitution on the diene reactant. When butadiene is employed as the diene reactant, the alkadienyl moiety will be 2,7-octadienyl. Alternatively, when the diene reactant is isoprene, the alkadienyl moiety is principally 3,7-dimethyl-2,7-octadienyl and/or 3,6-dimethyl - 2,7 - octadienyl and when 2,3-dimethylbutadiene is the diene reactant, the alkadienyl moiety is 2,3,6,7 - tetramethyl - 2,7 - octadienyl. Generically these alkadienyl moieties are represented by the formula

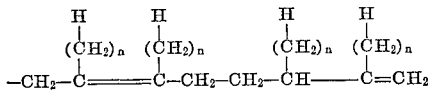

wherein $n$ independently is a whole number from 0 to 1 inclusive. Although it is within the contemplated scope of the present invention to effect reaction at each nontertiary amino moiety, it is also within the contemplated scope to N-alkadienylate only a portion of the nontertiary amino groups present, for example, to effect reaction at only one reactive site of an organic diamine. The process, in practice, will lead to the formation of mono- and di-2,7-alkadienyl derivatives of any particular nontertiary amino nitrogen atom possessing two N-hydrogen substituents, depending upon the concentration of conjugated diene reactant employed. For example, a primary amine such as aniline readily forms a N-(2,7-alkadienyl) derivative and/or a N,N-bis(2,7-alkadienyl)derivative, depending upon the quantity of conjugated diene used. The preferred amine product type comprises mono- or polyamines wherein each nontertiary amino group has undergone reaction to form the corresponding N-alkadienyl derivative.

It will be apparent that a wide variety of N-alkadienyl amines can be prepared by the process of the invention by varying the organic amine and the diene reactants. Illustrative of these products are N-(2,7-octadienyl)aniline prepared from aniline and butadiene, N-(3,6-dimethyl-2,7-octadienyl)-N-methylaniline and N-(3,7-dimethyl-2,7-octadienyl)-N-methylaniline prepared from N-methylaniline and isoprene and N-(2,3,6,7-tetramethyl-2,7-octadienyl)diethylamine prepared from diethylamine and 2,3-dimethylbutadiene, as well as other illustrative products such as N-(2,7-octadienyl)methylamine,
N,N'-bis(2,7-octadienyl)trimethylenediamine,
N-(3,6-dimethyl-2,7-octadienyl)-p-methoxyaniline,
N-(2,3,6,7-tetramethyl-2,7-octadienyl)piperidine,
N,N'-bis(2,7-octadienyl)benzidine,
N-(3,7-dimethyl-2,7-octadienyl)butylamine,
N-(2,7-octadienyl)-α-naphthylamine,
N-(2,7-octadienyl)-m-dimethylaminoaniline,
N-(2,7-octadienyl)-3-chloroethylamine,
N-(3,6-dimethyl-2,7-octadienyl)-4-aminohexylamine,
4,4'-bis(2,7-octadienylamino)biphenyl,
N-(2,7-octadienyl)-4-acetoxybutylamine,
N-(3,6-dimethyl-2,7-octadienyl)-2-dodecylamine,
N-(2,7-octadienyl)-2,4-dichloroaniline and
N-(2,7-octadienyl)cyclohexylamine.

The amine products of the invention are useful in a variety of applications. The remaining unsaturated linkages can be hydrated or hydroxylated to form useful alcohol derivatives from which esters or ethers are prepared. The amino moieties are oxidized to form useful amine-N-oxides, useful as detergents, or reacted with mineral acids to form quaternary ammonium salts. The ethylenic linkage serves as a dienophile in Diels-Alder condensations or as a reactive site in polymerization or copolymerization processes, and can be epoxidized to form epoxy derivatives which react with a variety of curing agents to form epoxy resins.

The rhodium(I) phenoxide complexes of the present invention are novel compositions. As previously mentioned, the rhodium(I) complexes $L_mRhZ$, wherein Z is hydrogen, acetate, lower alkyl, mononuclear aryl, or π-alkyl, are also novel. Consequently, a novel and useful group of rhodium(I) complexes is defined by the formula $$L_mRhY$$

wherein L is defined as previously stated, and Y is hydrogen, phenoxide, acetate, lower alkyl and mononuclear aryl, when $m$ is 3; and Y is π-allyl, phenoxide, and acetate, when $m$ is 2. As previously mentioned, π-allyl includes substituted as well as unsubstituted allyl moieties and mononuclear aryl includes phenyl and lower alkyl-substituted phenyls. Phenoxide in the rhodium(I) phenoxide complex represents the same empirical structure defined hereinabove by the term "phenoxide anion," in effect, the structure remaining from removal of the hydroxyl hydrogen of at least one phenolic hydroxyl group, i.e. a compound having at least one hydroxyl group bonded to a carbon atom which is a member of an aromatic ring. Exemplary of these rhodium complexes are phenoxobis(triphenylphosphine)rhodium(I),
phenoxotris(triphenylphosphine)rhodium(I),
methyltris(triphenylphosphine)rhodium(I),
n-butyltris(triphenylphosphine)rhodium(I),
phenyltris(triphenylphosphine)rhodium(I),
p-tolyltris(triphenylphosphine)rhodium(I),
π-allylbis(triphenylphosphine)rhodium(I),
π-methallylbis(triphenylphosphine)rhodium(I),
π-cyclohexenylbis(triphenylphosphine)rhodium(I),
π-cyclooctenylbis(triphenylphosphine)rhodium(I),
π-crotylbis(triphenylphosphine)rhodium(I),
acetatobis(triphenylphosphine)rhodium(I),
hydridotris(triphenylphosphine)rhodium(I), and the like. A preferred novel catalyst composition useful in the process of the invention comprises rhodium complex represented by the formula $$L_mRhY$$

wherein, when $m$ is 3, Y is selected from the group consisting of hydrogen, phenoxide, acetate, lower alkyl, and mononuclear aryl; and when $m$ is 2, Y is selected from the group consisting of π-allyl, phenoxide, and acetate; and L independently is $R_3P$ wherein R independently is an organo group of from 1 to 10 carbon atoms with only aromatic unsaturation and is attached to the phosphorus atom by a carbon-phosphorus bond.

The $L_mRhY$ complexes wherein Y is lower alkyl or mononuclear aryl are prepared by Grignard synthesis. A rhodium(I) halide complex is treated with lower-alkyl or mononuclear-aryl magnesium halide Grignard reagent; the desired complex product is customarily observed as a precipitate and is recoverable as by filtration. Rhodium-(I) halide complexes are described in copending application of K.C. Dewhirst, U.S. Ser. No. 417,482 now Pat. No. 3,489,786, filed Dec. 10, 1964. The novel complexes wherein Y is hydrogen may be prepared by reaction of rhodium(I) halide complexes with aluminum alkyls in which the alkyl moiety possesses a tertiary hydrogen atom, e.g. triisopropylaluminum. The complexes wherein Y is phenoxide are readily prepared by reacting either a complex wherein Y is lower alkyl, mononuclear aryl, π-allyl, or hydrogen, with an appropriate phenol or a rhodium(I) halide complex with an appropriate phenoxide anion, which has been defined hereinabove. The complexes wherein Y is acetate are prepared by treating a rhodium(I) halide complex with a metal acetate salt, such as silver acetate.

Reaction of rhodium(I) chloride complexes with allylmagnesium chloride yields the π-allyl complexes as yellow crystalline solids. Use of the corresponding bromo reagents is advantageous because products of high purity are more easily obtained. Cyclic π-allyl complexes and also π-crotyl complexes are obtained by an alternate procedure, the addition of the corresponding conjugated diolefin, e.g. cyclohexadiene or butadiene, to hydridorhodium complexes, such as the $L_3RhH$ of the invention or the $L_4RhH$ described in copending application of K. C. Dewhirst, U.S. Ser. No. 473,222 now Pat. No. 3,480,659, filed July 19, 1965. The reaction of rhodium(I) chloride complexes with conjugated diolefin in the presence of sodium borohydride also yields π-allyl complexes but as rather impure substances. The π-allyl complexes are moderately soluble in aromatic hydrocarbons, sparingly soluble in ethers, and practically insoluble in aliphatic hydrocarbons.

EXAMPLE I 11.2 grams of chlorotris(triphenylphosphine)rhodium-(I), prepared according to the procedure of copending application of K. C. Dewhirst, U.S. Ser. No. 417,482 now Pat. No. 3,489,786, filed Dec. 10, 1964, was suspended in 50 ml. of dry ether and an excess of triisopropylaluminum (5 ml. of 100% aluminum alkyl) was added thereto. A rapid color change from red to yellow occurred and a yellow solid precipitated. The yellow precipitate was filtered, washed, and dried, yielding 9.2 g. (85% of theory) of hydridotris(triphenylphosphine)rhodium-(I).

Analysis.—Calculated for $C_{54}H_{46}P_3Rh$ (percent): C, 72.8; H, 5.2; P, 10.4; Rh, 11.6. Found (percent): C, 71.9; H, 5.1; P, 10.3; Rh, 11.2.

EXAMPLE II

Chlorotris(triphenylphosphine)rhodium(I) (7.2 g., 7.8 mmoles) was suspended in 200 ml. of absolute ether. Excess methylmagnesium iodide (20 ml., 1.9 moles) was added and the mixture stirred for 24 hours at 0° C. The resulting yellow solid was filtered, washed with ether and n-hexane, and dried in high vacuum to give an almost quantitative yield of methyltris(triphenylphosphine)rhodium(I).

Analysis.—Calculated for $C_{55}H_{46}P_3Rh$ (percent): C, 73.0; H, 5.4; P, 10.3; Rh, 11.4. Found (percent): C, 72.8; H, 5.3; P, 10.3; Rh, 11.1.

EXAMPLE III

Methyltris(triphenylphosphine)rhodium(I) (3.1 g., 3.4 mmoles), prepared in Example II, was reacted with 6 ml. of phenol. Gas evolved containing 65% methane and 3% ethane of the calculated amount for $CH_4$ and $CH_3$—$CH_3$. The resulting red residue was washed with n-hexane and recrystallized from a toluene solution containing small amounts of triphenylphosphine, yielding 2.6 g. (77% of theory) of phenoxotris(triphenylphosphine)rhodium(I).

Analysis.—Calculated for $C_{60}H_{50}OP_3Rh$ (percent): C, 73.3; H, 5.1; P, 9.5; Rh, 10.5. Found (percent): C, 73.0; H, 4.9; P, 8.8; Rh, 9.9.

EXAMPLE IV

Phenoxotris(triphenylphosphine)rhodium(I), prepared in Example III, was stirred for 24 hours in n-hexane at ambient temperature. The resulting phenoxobis(triphenylphosphine)rhodium(I) was recrystallized from toluene.

Analysis.—Calculated for $C_{42}H_{35}OP_2Rh$ (percent): C, 70.0; H, 4.8; P, 8.6; Rh, 14.3. Found (percent): C, 69.4; H, 4.9; P, 8.7; Rh, 13.7.

EXAMPLE V

In a Schlenk tube was suspended 5 g. (5.5 mmoles) of chlorotris(triphenylphosphine)rhodium(I) in 30 ml. of dry ether under nitrogen or argon. To the mixture was added 6 mmoles of allylmagnesium chloride solution under stirring at room temperature. The suspension gradually turned from red to yellow, and the reaction was completed in about 24 hours. The mixture was filtered by suction in an inert atmosphere, the solid dissolved in dry, air-free benzene or toluene and filtered again by gravity. The filtrate, which may vary in color from yellow to red, was concentrated to 5–10 ml.; then, the same volume of ether was added. Yellow crystals precipitated, which were filtered, washed with a small amount of ether and a hydrocarbon solvent (e.g., hexane), and finally dried, yielding 3 g. (80% of theory) of π-allylbis(triphenylphosphine)rhodium(I), M.P. >170° C. (dec.).

If the reaction is carried out with bromotris(triphenylphosphine)rhodium(I) and allylmagnesium bromide, a practically pure product can be obtained by simply filtering the reaction mixture. All impurities are soluble in ether.

Analysis.—Calculated for $C_{39}H_{35}P_2Rh$ (percent): C, 70.0; H, 5.2; P, 15.4; Rh, 9.3. Found (percent): C, 71.1; H, 5.5; P, 15.5; Rh, 9.5.

EXAMPLE VI

Following the directions of Example V and using metallylmagnesium chloride as the Grignard reagent produced yellow crystals of π-methallylbis(triphenylphosphine)rhodium(I), which were recrystallized from benzene.

Analysis.—Calculated for $C_{40}H_{37}P_2Rh$ (percent): C, 70.4; H, 5.5; P, 15.1; Rh, 9.1. Found (percent): C, 71.1; H, 5.7; P, 14.4; Rh, 8.5.

EXAMPLE VII

A Schlenk tube was charged in an inert atmosphere (nitrogen or argon) with 5 g. of hydridotetrakis(triphenylphosphine)rhodium(I), prepared according to the procedure of copending application of K. C. Dewhirst, U.S. Ser. No. 473,222 now Pat. No. 3,480,659, filed July 19, 1965, and about 30 ml. of 1,3-cyclohexadiene. The mixture was stirred at room temperature until a clear solution resulted, about ½ to 1 hour. Unreacted diene was stripped off and the residue treated with about 5 ml. of anhydrous, air-free ether. The resulting yellow crystals were filtered, washed with a small quantity of ether, then with hexane, and dried, yielding 3 g. (95% of theory) of π-cyclohexenylbis(triphenylphosphine)rhodium (I).

Analysis.—Calculated for $C_{42}H_{39}P_2Rh$ (percent): C, 71.1; H, 5.6; P, 14.5; Rh, 8.7. Found (percent): C, 69.9; H, 5.4; P, 13.9; Rh, 8.2.

EXAMPLE VIII

A glass pressure vessel was charged with 5 g. of hydridotetrakis(triphenylphosphine)rhodium(I) in an inert atmosphere. About 30 ml. of butadiene was condensed therein and the closed vessel was kept stirring magnetically at a temperature of about 40° C. for about 12 hours. A clear yellow solution was obtained which, upon being cooled to −78° C., deposited yellow crystals. The crystals were filtered rapidly, washed with a small amount of ether and then hexane, yielding 2 g. (70% of theory) of π-crotylbis(triphenylphosphine)rhodium(I).

*Analysis.*—Calculated for $C_{40}H_{37}P_2Rh$ (percent): C, 70.4; H, 5.5; P, 15.1; Rh, 9.1. Found (percent): C, 69.8; H, 5.6; P, 15.4; Rh, 8.8.

EXAMPLE IX

In 50 ml. of toluene were suspended 3.8 g. (4.1 mmoles) of chlorotris(triphenylphosphine)rhodium(I) and 2 g. (12 mmoles) of silver acetate. The reaction mixture was shaken for 24 hours. An additional 150-ml. portion of toluene was added and the resulting mixture filtered. The filtrate was concentrated. Then n-hexane was added and the filtrate was kept at −15° C. for 24 hours. Filtration thereof yielded 1.9 g. (49% of theory) of acetatobis(triphenylphosphine)rhodium(I).

*Analysis.*—Calculated for $C_{38}H_{33}O_2P_2Rh$ (percent): C, 66.4; H, 4.9; P, 9.0; Rh, 15.0. Found (percent): C, 64.9, H, 4.8; P, 8.6; Rh, 14.6.

EXAMPLE X

Stirred together for 24 hours at room temperature were 6.5 g. (7.1 mmoles) of chlorotris(triphenylphosphine)rhodium(I), 15 ml. of a 2-molar solution of phenylmagnesium bromide, and 100 ml. of dry ether. A yellowish precipitate formed and was filtered. The precipitate was washed a few times with ether and dried at reduced pressure ($10^{-4}$ mm. Hg), yielding 7.5 g. (90% of theory) of phenyltris(triphenylphosphine)rhodium(I).

*Analysis.*—Calculated for $C_{60}H_{50}P_3Rh$ (percent): C, 74.5; H, 5.2; P, 9.6; Rh, 10.6. Found (percent): C, 74.1; H, 5.1; P, 9.8; Rh, 11.1.

To 3.75 g. of phenyltris(triphenylphosphine)rhodium (I) dissolved in 10 ml. of toluene was added 4 g. of phenol. On being heated, the yellow solution turned dark red. After the reaction mixture was stirred at 80° C. for 20 minutes, the benzene formed therefrom, together with the toluene, was distilled and analyzed by gas-liquid chromatographic (GLC) analysis. Quantitative formation of benzene was obtained concomitant with formation of phenoxotris(triphenylphosphine)rhodium(I).

EXAMPLE XI

A series of experiments was conducted using various complexes of rhodium as the source of catalyst for the dimerization-addition reaction of butadiene and phenol to produce phenoxy-2,7-octadiene. In each case 0.1 g. of rhodium compound, 1.5 g. of phenol, 3 ml. of benzene, and about 4 ml. of butadiene were sealed in a glass ampoule. The ampoule was placed in an oil bath at 70° C. for a period of 60 hours. The product mixture was then removed, filtered, and analyzed by gas-liquid chromatography (GLC) to determine the conversion based on phenol charged and the selectivity of 1-phenoxy-2,7-octadiene based on phenol charged. The results of this series are shown below in Table 1.

TABLE 1

| Rhodium compound | Conversion, percent | Selectivity to 1-$C_6H_5O$-$C_8H_{15}\Delta^{2,7}$, percent |
| --- | --- | --- |
| π-Allylbis(triphenylphosphine)-rhodium(I) | 97 | 87 |
| Methyltris(triphenylphosphine)-rhodium(I) | 95 | 85 |
| Hydridotris(triphenylphosphine)-rhodium(I) | 95 | 85 |
| Hydridotetrakis(triphenylphosphine)-rhodium(I) | 95 | 85 |
| Phenoxobis(triphenylphosphine)-rhodium(I) | 95 | 85 |
| Phenoxotris(triphenylphosphine)-rhodium(I) | 95 | 85 |

EXAMPLE XII

A series of experiments was conducted as described in Example XI, except that sodium phenate was added as phenoxide anion catalyst promoter. The results of this series are shown in the following table, Table 2.

TABLE 2

| Rhodium compound | Sodium phenate, g. | Conversion, percent | Selectivity to 1-$C_6H_5O$-$C_8H_{15}\Delta^{2,7}$, percent |
| --- | --- | --- | --- |
| Chlorotris(triphenylphosphine)-rhodium(I) | 0.125 | 95 | 85 |
|  | 0.125 | 95 | 85 |
| Bis[chlorodicarbonyl-rhodium(I)] | 0.12 | 65 | 60 |
| Bis[chlorodiethylene-rhodium(I)] | a0.12 | 20 | 45 | a Provided with 0.41 g. of triphenylphosphine.

EXAMPLE XIII

A series of experiments was conducted as in Example XI except that substituted phenols were utilized and the reaction was run at 80° C. for 70 hours. The results of this series are shown in Table 3 below.

TABLE 3

| Rhodium compound | Substituted phenol | Conversion, percent | Selectivity to 1-ArO-$C_8H_{14}\Delta^{2,7}$, percent |
| --- | --- | --- | --- |
| π-Cyclohexenylbis-(triphenylphosphine)-rhodium(I). | p-Cl | 70 | 65 |
| Do | p-$OCH_3$ | 95 | 95 |

EXAMPLE XIV

A series of experiments was conducted using various amines for the dimerization-addition reaction of butadiene and amine. In each case 0.1 g. of phenoxobis(triphenylphosphine)rhodium(I), 1.5 ml. of amine, 3 ml. of benzene, and about 4 ml. of butadiene were sealed in a glass ampoule. The ampoule was placed in an oil bath at 80° C. for a period of 70 hours. The product mixture was then removed, filtered, and analyzed by gas-liquid chromatography (GLC) to determine the conversion based on amine charged and the selectivity to product based on amine charged. The results of these series are shown in the following table, Table 4.

TABLE 4

| Amine | Conversion, percent | Selectivity, percent | Product |
| --- | --- | --- | --- |
| n-methylaniline | 55 | 98 | N-(2,7-octadienyl)-N-methylaniline. |
| Aniline | 36 | 33 | N-(2,7-octadienyl)aniline. |
|  |  | 67 | N,N-bis(2,7-octadienyl)-aniline. |
| Diethylamine | 5 | ca. 90 | N,N-diethyl-N-(2,7-octadienyl)-amino. |

EXAMPLE XV

Four milliliters of butadiene and 2 ml. of piperidine in 3 ml. of benzene, together with 0.1 g. of π-crotylbis(triphenylphosphine)rhodium(I) and 13 mg. of phenol, were sealed in a glass ampoule. The ampoule was placed in an oil bath at 70° C. for a period of 60 hours. The product mixture was then removed, filtered, and analyzed by gas-liquid chromatography (GLC). Based on piperidine charged, the conversion was 80% with a 92% selectivity to N-(2,7-octadienyl)piperidine.

When isoprene is employed as the diene reactant in place of the butadiene of the above experiment, a good yield of a mixture of N-(dimethyl - 2,7 - octadienyl)piperidines is obtained, which mixture principally comprises N-(3,6 - dimethyl - 2,7 - octadienyl)piperidine and N-(3,7-dimethyl-2,7-octadienyl)piperidine.

EXAMPLE XVI

Eight milliliters of butadiene and 2 ml. of phenol in 3 ml. of chlorobenzene, together with 100 mg. of acetatobis(triphenylphosphine)rhodium(I) and 34 mg. of sodium phenoxide, were sealed in a glass ampoule. The ampoule and contents were shaken for 60 hours at 60–70° C. The product mixture was then removed, filtered, and analyzed by gas-liquid chromatography (GLC). Based on phenol charged, the conversion was 100% with a 97% selectivity to 1-phenoxy-2,7-octadiene.

We claim as our invention:

1. A rhodium complex represented by the formula $L_mRhY$ wherein $m$ is an integer from 2 to 3 inclusive, Y is selected from the group consisting of phenoxide, lower alkyl, and mononuclear aryl, when $m$ is 3, and from the group consisting of π-allyl and phenoxide, when $m$ is 2, and L independently is an $R_3P$ ligand wherein R independently is a hydrocarbyl group of from 1 to 10 carbon atoms with only aromatic unsaturation and is attached to the phosphorus atom by a carbon-phosphorus bond.

2. The complex of claim 1 wherein $R_3P$ is triphenylphosphine.

3. The complex of claim 2, wherein $m$ is 3 and Y is phenoxide.

4. The complex of claim 2 wherein $m$ is 2 and Y is π-allyl.

5. The complex of claim 2 wherein $m$ is 3 and Y is methyl.

6. The complex of claim 2 wherein $m$ is 2 and Y is phenoxide.

References Cited

UNITED STATES PATENTS

| | | | |
|---|---|---|---|
| 3,133,943 | 5/1964 | Chatt et al. | 252—431 PX |
| 3,480,659 | 11/1969 | Dewhirst | 260—429 |
| 3,511,880 | 5/1970 | Booth | 252—431 PX |

PATRICK P. GARVIN, Primary Examiner

U.S. Cl. X.R.

252—431 P, 431 C